US005638273A

United States Patent [19]

Coiner et al.

[11] Patent Number: 5,638,273

[45] Date of Patent: Jun. 10, 1997

[54] VEHICLE DATA STORAGE AND ANALYSIS SYSTEM AND METHODS

[75] Inventors: Ronald W. Coiner, N. Huntingdon; John M. Coiner, Penn; Ryan E. Drummond, Herminie, all of Pa.

[73] Assignee: Remote Control Systems, Inc., Irwin, Pa.

[21] Appl. No.: 412,881

[22] Filed: Mar. 29, 1995

[51] Int. Cl.[6] .......... G06F 19/00

[52] U.S. Cl. .......... 364/424.04; 364/551.01; 369/21; 360/5

[58] Field of Search .......... 364/424.03, 424.04, 364/551.01, 550; 73/117.2, 117.3; 369/21; 360/5, 6

[56] References Cited

U.S. PATENT DOCUMENTS

| | | | |
|---|---|---|---|
| 4,143,417 | 3/1979 | Wald et al. | 364/900 |
| 4,258,421 | 3/1981 | Juhasz et al. | 364/424 |
| 4,638,289 | 1/1987 | Zottnik | 340/52 H |
| 5,046,007 | 9/1991 | McCrery et al. | 364/424.04 |
| 5,065,321 | 11/1991 | Bezos et al. | 364/424.04 |
| 5,327,347 | 7/1994 | Hagenbuch | 364/424.07 |
| 5,388,045 | 2/1995 | Kamiya et al. | 364/424.04 |
| 5,446,659 | 8/1995 | Yamawaki | 364/424.03 |
| 5,477,141 | 12/1995 | Nather et al. | 324/160 |
| 5,526,269 | 6/1996 | Ishibashi et al. | 364/424.03 |

*Primary Examiner*—Michael Zanelli
*Attorney, Agent, or Firm*—Larson and Taylor

[57] ABSTRACT

A system for monitoring, recording, and analyzing operational and incident data from a machine, particularly a vehicle. The system includes a computer controlled device, mounted onboard the machine, which collects and records data supplied to it from a variety of sensors positioned to sense operational parameters of the machine. The device provides for storing operational data at one frequency while storing data surrounding an incident or triggering event at a higher frequency, thus, recording incident data with a higher resolution than that associated with normal operating data. The incident data is stored at a higher frequency for predetermined periods both before and after the incident or triggering event.

15 Claims, 5 Drawing Sheets

VEHICLE DATA STORAGE AND ANALYSIS SYSTEM AND METHODS

BACKGROUND OF THE INVENTION

1. Field of the Invention

The present invention relates to a system for systematically recording data corresponding to selected machine parameters over time and for downloading and analyzing that data once it has been recorded. More particularly, the present invention relates to a system for recording and analyzing vehicle data.

2. The Prior Art

It is often desirable to record information pertaining to the operation of a machine, particularly a vehicle, over time. This information is useful in analyzing both the operating condition of the machine and how the machine is being controlled by the operator during the monitoring period. Also, this information can be useful in determining the condition of a machine just prior to, or just after, a specific incident or event (such as engine overheating, brake failure, a vehicle accident, or the like) for maintenance, insurance, or legal purposes.

Various systems to monitor and record vehicle data have been provided in the prior art. Many of these systems provide onboard devices that record the data for a period of time and then transfer the data to a remote location for later analysis. U.S. Pat. No. 5,046,007, to McCrery et al., and U.S. Pat. No. 5,065,321, to Bezos et al., provide examples of this type of system. While it is desirable to record many different data signals for a long period of time, memory concerns limit the amount of data which may be stored in an on-board device.

Rather than storing the data from each sensor in real time, a system can be more efficient if it provides a means for compressing the data by storing only portions of the sensed data, while ensuring that at least the most relevant information is stored. With such compression, a given amount of memory can store data covering a much longer period of time.

Various prior art systems provide for compressing vehicle data as the systems record such data. U.S. Pat. Nos. 5,327,347, to Hagenbuch, and 4,258,421, to Juhasz et al., which are herein incorporated by reference, are representative of microprocessor-based digital systems that compress data by sampling a plurality of sensors at a particular frequency and storing the data provided by the sensors only when they are sampled. The Juhasz et al. patent discloses a system that further compresses the data by comparing each data signal with a reference threshold and only storing the data signal if the data signal exceeds its reference threshold.

While these type of systems increase the period of time the system is capable of recording data, it is also possible for an incident or event to occur during the time between samples. The data surrounding this incident can be extremely important. Thus, while decreasing the sampling rate or frequency increases the operating time that may be recorded in a memory of a particular capacity, it also decreases the likelihood that a sample will be taken at, or around, the time of an incident. Of course, the inverse of this is also true: increasing the sampling frequency decreases the operating time that may be recorded, but it increases the likelihood that a sample will be taken at, or around, the time of an incident.

Further, even if a sample is taken at the time of an incident, if the sample frequency is too low, important information before and after the incident may be missed. Thus, while normal operating data can be useful if stored at a low frequency, data surrounding the time of an incident is most useful if it is stored at a high frequency so that better resolution is provided for analysis.

U.S. Pat. No. 4,638,289, to Zottnik, discloses a system that records vehicle data just prior to an accident. The Zottnik patent provides for periodically sampling a plurality of sensors at a relatively high frequency and stores the record created by each sampling in memory. Once a predetermined number of records are stored, the next record is stored over the oldest record. Thus, the memory always contains a predetermined number of the most recent records. Upon sensing an accident, the system freezes the data stored in memory, for later analysis. Because the system only retains the data immediately preceding an accident, a high sampling frequency may be used without encountering memory concerns.

A further problem that exists with the prior art monitoring and recording systems occurs when a particular system provides for sampling a large number of sensors. There are difficulties associated with installing the system in a vehicle if the installer has to connect each sensor to one predetermined input channel on the device. This procedure requires that the installer carefully match each input sensor to the predetermined input channel associated with that sensor and further requires that the input channel labels be determined prior to installation.

SUMMARY OF THE INVENTION

The present invention relates to a system for monitoring, recording and analyzing operational and incident data from a machine, particularly a vehicle. Once data is monitored and recorded, the system provides for analyzing the data to determine how the vehicle is being operated and how the vehicle is functioning.

The system includes a computer controlled device, mounted onboard the vehicle, which collects and records data supplied to the device from a variety of sensors positioned to sense operational parameters of the vehicle, such as engine temperature, vehicle speed, brake activation, plow location, and the like. These sensors are connected to the input channels of the device and the device samples the input channels at a predetermined frequency. The data collected during a sampling is compiled into a record. The sampled data is then compared to a set of predetermined thresholds (which are input by the user) to determine if any of the data exceed the applicable threshold, or, in the case of two-state data (on or off, up or down, and the like), if the threshold is attained. This exceeding or attainment of a threshold is considered to be an incident or trigger.

While the sampling frequency remains constant, the device provides for storing normal operating data at one frequency and storing incident data at a higher frequency. Incident data is defined as that data that occurs for predetermined times before and after an incident or trigger. Thus, the device provides the user with both low resolution operational data covering a long period of time and high resolution incident data.

In a preferred embodiment, the sample interval or rate, which is the frequency at which the inputs are sampled, is preset. Certain other parameters used by the device are also preset, but may be changed by the user. These parameters include the operational mode storage interval, the trigger mode storage interval, the pre-trigger storage period, and the post-trigger storage period. The operational mode storage interval is the frequency at which records are stored during normal operating conditions. The trigger mode storage interval is the frequency at which records are stored during the time surrounding an incident or trigger event. The pre-trigger and post-trigger storage periods are the periods of time before and after a trigger event during which records will be stored at the trigger mode storage interval.

After the onboard device has recorded the data, the data may be transferred to another computer for storage and analysis. A serial link is provided for connecting the other computer (a portable computer, in the preferred embodiment) to the onboard device. Data is downloaded to the portable computer and is either analyzed using the portable computer or is later transferred to a second, remote computer for storage and analysis.

The system provides for downloading the data to a portable computer through a variety of communication methods including direct wire, infrared, radio, cellular, or optical.

To overcome the installation difficulties mentioned above, the system further allows the installer to connect the sensors to the input channels of the device virtually arbitrarily. Once the sensors are connected, the installer may then label each input with the aid of a setup software program which is installed on a portable computer that is connected to the onboard device. The setup program also is used to further program the computer in the onboard device.

Other objects, features, and advantages of the present invention will be set forth in, or will become apparent from, the detailed description of the preferred embodiments of the invention which follows.

DESCRIPTION OF THE PREFERRED EMBODIMENTS

Figure 1:
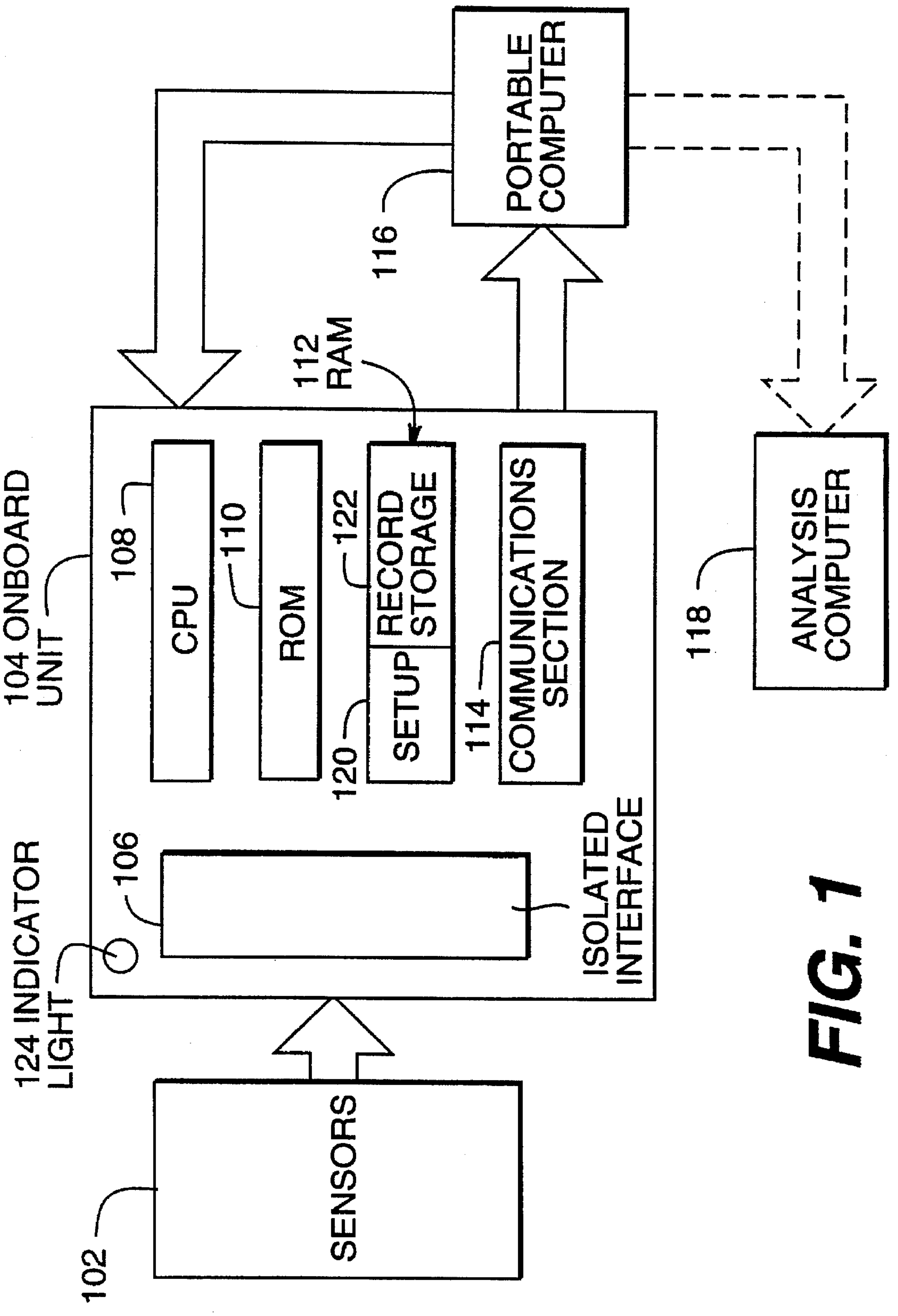
FIG. 1 is a block diagram of a preferred embodiment of the vehicle monitoring and recording system of the present invention.

FIG. 1 is a block diagram of a preferred embodiment of the vehicle monitoring and recording system of the present invention. An Onboard unit 104 comprises an isolated interface 106, a CPU (central processing unit) 108, a ROM (read only memory) 110, a RAM (random access memory) 112, and a communications section 114. RAM 112 is divided into a setup section 120 and a record storage section 122. An Indicator light 124 is used to indicate when record storage section 122 is nearly full or full.

An operating program for controlling CPU 108 is stored in ROM 110. The setup parameters for the operating program are preset but can be altered by the user via a setup program which runs on a portable computer indicated at 116. These setup parameters include: the operational mode storage interval, the trigger mode storage interval, the pre-trigger storage period, and the post-trigger storage period. The trigger mode storage interval and the operational mode storage interval are both constrained to be integer multiples of the sample interval. In a preferred embodiment, the sample interval is 0.05 seconds. Thus, samples occur 20 times per second.

Data from the various vehicle parameters is provided by a plurality of sensors indicated at 102 which are connected to isolated interface 106 of onboard unit 104. CPU 108 samples the inputs at interface 106 at a predetermined sample interval, (e.g., 0.05 seconds in this preferred embodiment). Each sample made at a time corresponding to the trigger mode storage interval forms a record and that record is stored in an area of record storage section 122 of RAM 112 which is set aside for pre-trigger data record storage. While some records are only temporarily stored in record storage section 122 and then discarded, other records are selected for long term storage in record storage section 122. This selection is done according to a protocol determined by the operating program stored in ROM 110. As noted above, setup parameters, which are used by the operating program, are stored in setup section 120 of RAM 112.

Once the RAM 112 is full, or at any time chosen by the user, the records stored in RAM 112 may be downloaded from the onboard unit to portable computer 116 through communications section 114. The records may then be transferred from portable computer 116, and further, to analysis computer 118 for storage or analysis.

Figure 2:
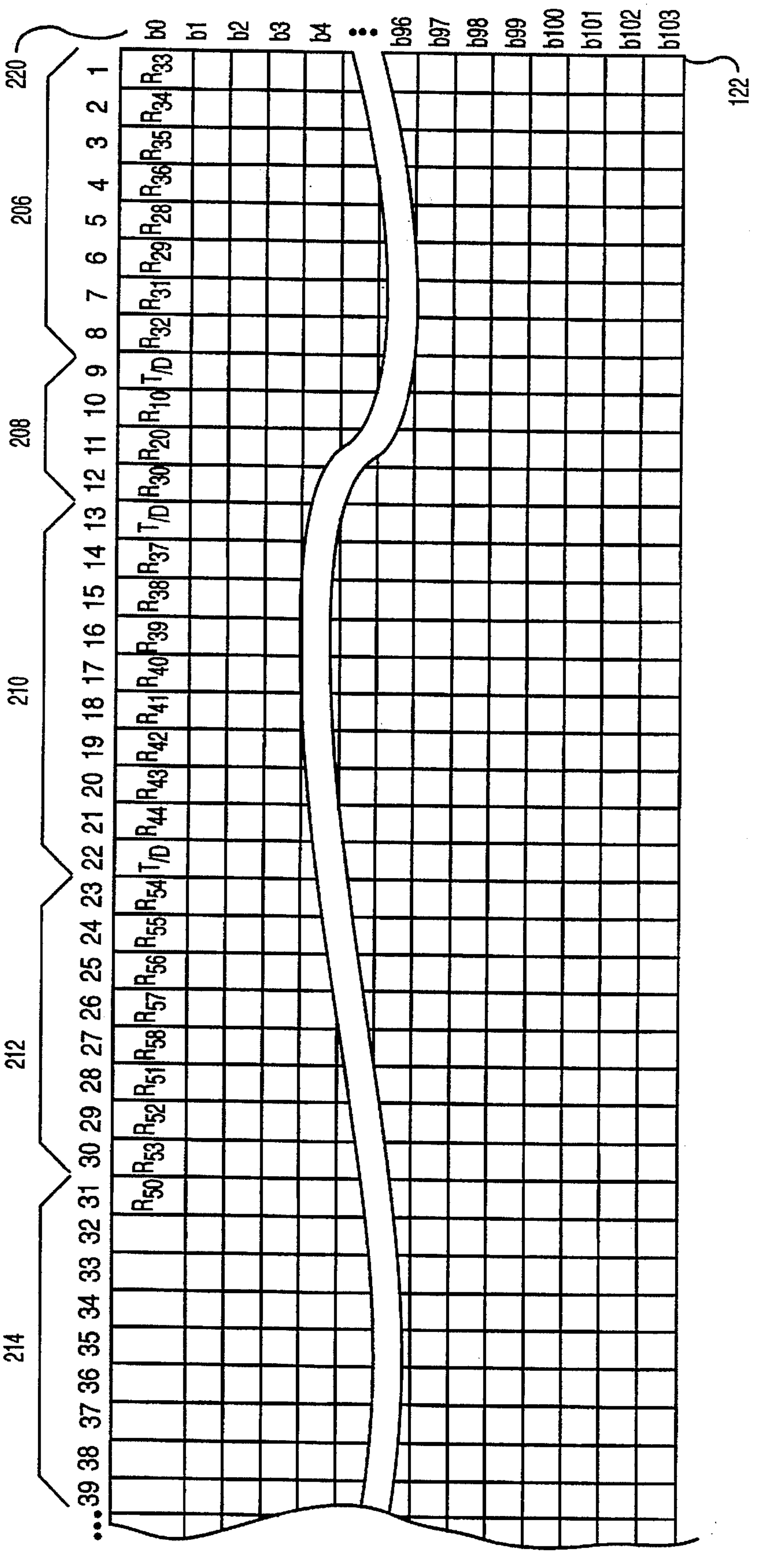
FIG. 2 shows the record storage section of the embodiment of FIG. 1 at a particular point in a recording cycle.

The protocol which determines which records are selected is explained with reference to FIG. 2. FIG. 2 shows record storage section 122 of RAM 112 at a point in time when fifty-eight records have been either temporarily or long term stored in record storage section 122. For ease of description, record storage section 122 is shown as an array that holds records that are one hundred and four bits (b0 to b103) in length, with the bit numbers 220 being shown in FIG. 2 down the right side of the array and the record storage positions 222 shown across the top of the array. However, it should be understood that in practice, the record storage section 122 need not be designated as such.

Figure 5:
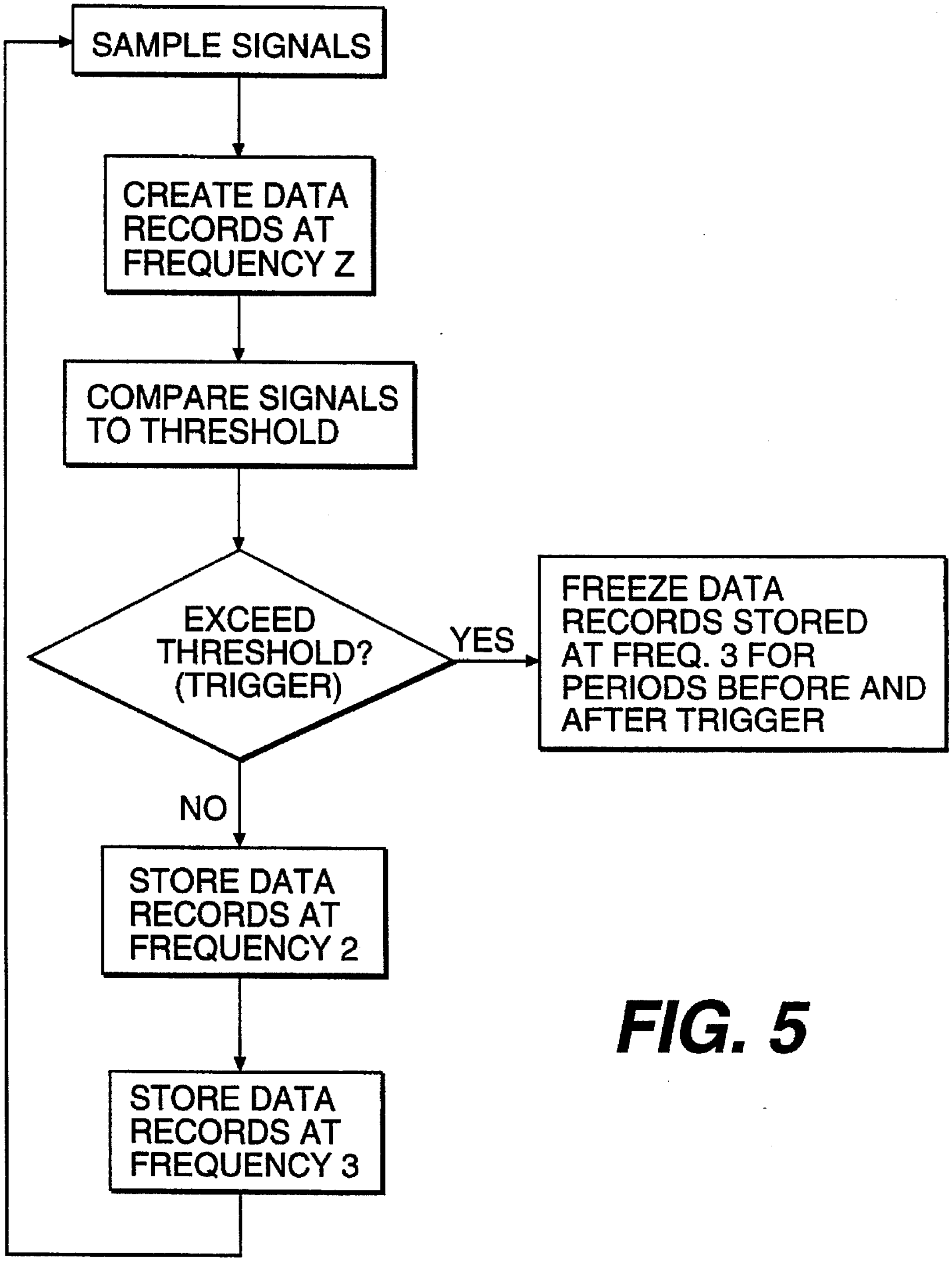
FIG. 5 shows the process steps performed by the CPU of FIG. 1.

FIG. 5 shows the process steps carried out by the CPU of FIG. 1 and these steps are described generally below.

In the specific, non-limiting, example illustrated in FIG. 2, the sample interval is equal to one sample every 0.05 seconds and the setup parameters are set as follows: the operational mode storage interval is set to once every 10 seconds; the trigger mode storage interval is set to once every 1 second; the pre-trigger storage period is set to 8 seconds; and the post-trigger storage period is set to 8 seconds. In the preferred embodiment, the operational mode storage interval is user selectable from 0 to 999 seconds, wherein a 0 setting indicates no data will be stored. The trigger mode storage interval is user selectable from 0.05 to 12.75 seconds. Both the trigger mode storage interval and the operational mode storage interval are integer multiples of the sample interval. Thus, the sample frequency is an integer multiple of both the trigger mode storage frequency and the operational mode storage frequency, since frequency is defined as the inverse of the interval.

The inputs are sampled once every 0.05 seconds and every 20th sample is formed into a record (the trigger mode storage interval (1) divided by the sample interval (0.05)). Thus, given the parameters above, a record is formed every second. The record is then coded with an 8 bit identification code as a pre-trigger record and stored into a pre-trigger storage area 206 which is allocated in record storage section 122. The size of the pre-trigger storage area 206 is allocated such that it is capable of holding a number of records equal to the pre-trigger storage period (8) divided by the trigger mode storage interval (1). Thus, given the parameters above in the specific example under consideration, pre-trigger storage area 206 is capable of holding 8 records.

Pre-trigger storage area 206 will become full upon storage of the 8th record in the area. As this happens, successive records will then wrap around and be stored over the existing records in the pre-trigger storage area 206, the newest record overwriting the oldest record (e.g., $R_9$ will overwrite $R_1$). Thus, the pre-trigger storage area will always contain the most recent 8 records.

Every 200th sample (the operational mode storage interval (10) divided by the sample interval (0.05)) is coded as an operational record and is stored in the next available address of operational storage area 208 of record storage section 122, instead of in pre-trigger storage area 206. This occurs once every ten seconds, given the specific parameters described above. Thus, every 10th record is stored in operational storage area 208. Before an operational record is stored in operational storage area 208, the record is given a 8 bit code which identifies it as an operational record so that the record may be distinguished from any other type of record.

After the inputs are sampled each time, the sampled data is compared with predetermined thresholds and if any of the data exceeds (or attains, in the case of two-state data) its associated threshold, a trigger is determined to have occurred during that record.

FIG. 2 depicts the point in time when fifty-eight records have been stored at the rate of 1 per second, although some of the records have been overwritten. Briefly considering the storage operation, first, time/date record $R_0$ was stored in the first available location in operational storage area 208 when the vehicle ignition was started. Second, records $R_1$ through $R_{36}$ (excluding operational records $R_{10}$, $R_{20}$, and $R_{30}$) were then successively stored in pre-trigger storage area 206 eight at a time, with record $R_9$ overwriting record $R_1$, and so on, as explained above. In this example, a trigger event or incident was detected in record $R_{36}$ and the records in the pre-trigger storage area 206 at that time were frozen (long term stored) there. Also, time and date information was added to record $R_{36}$.

As described above, every 10th record is considered an operational record and, in the example being discussed, these records were stored in operational storage area 208 instead of pre-trigger storage area 206. Thus, after the time/date record (T/D), the first 3 records stored in operational storage area 208 are operational records $R_{10}$, $R_{20}$, and $R_{30}$, and these records were coded as operational records.

Once a trigger incident was detected in record $R_{36}$, post-trigger storage area 210 was allocated in the next available location after operational storage area 208. The records which were formed during the post-trigger period (the next 8 seconds) were stored in post-trigger storage area 210. These are records $R_{37}$ through $R_{44}$ in the example shown. The record at the beginning of the post-trigger period ($R_{37}$) and the record at the end of the post-trigger period ($R_{44}$) were coded as such so that the post-trigger records can be distinguished from the operational records during later analysis.

After the last post-trigger record, record $R_{44}$, was stored, a new pre-trigger area 212 was allocated in record storage section 122 and the selection and storage process continued in a manner similar to that above. In the example shown, records $R_{45}$ through $R_{58}$ were stored in new pre-trigger area 212 ($R_{54}$ through $R_{58}$ overwriting $R_{45}$ through $R_{49}$) and operational record $R_{50}$ was stored in the next available address, this address beginning the allocation of new operational storage area 214. However, in this example, no trigger has been detected in records and, therefore, new records will continue to overwrite the older records in pre-trigger area 212 until a trigger is detected, at which point the records in pre-trigger area 212 will be frozen there. After 8 post-trigger records are stored in the next allocated post-trigger storage area, another pre-trigger storage area will be allocated. The process continues as above until record storage section 122 becomes full or until the data is downloaded from the on-board unit by the user. A new time/date record is placed in the current operational storage area each time the onboard unit is activated (i.e., by starting the vehicle ignition).

In the example shown, the amount of record storage section 122 that is necessary to store the pre-trigger and post-trigger records surrounding an incident is an amount equal to 16 records. The operating program may be programmed to give priority to trigger data over operational data. Thus, when record storage section 122 is getting close to full, an amount of memory necessary to store the 16 data records surrounding a trigger incident will be reserved for this data, and operational data records will no longer be stored. Also, indicator light 124 is provided to warn the vehicle operator or the user when record storage section 122 is close to full or full. Alternatively, a plurality of lights or another type of indicator may be used for this purpose.

Figure 3:
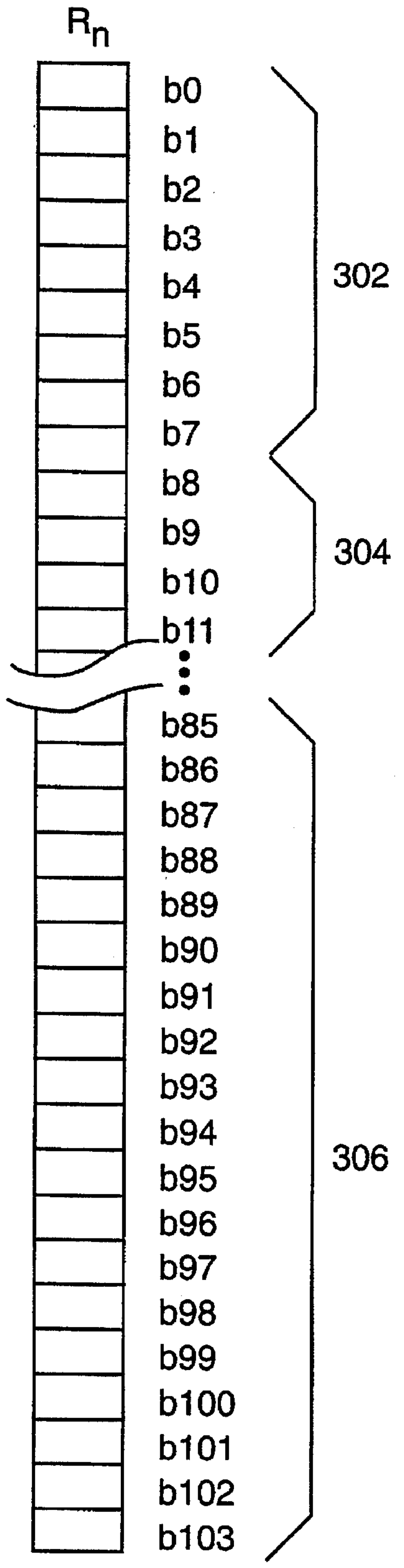
FIG. 3 shows a generic record $R_n$ representing the records as used in the preferred embodiment of FIG. 2.

FIG. 3 shows a generic record $R_n$ representing the records as used in the preferred embodiment of FIG. 2. As noted above, in this example, each record is one hundred and four bits long and the bits of the record are labeled along the right side as b0 through b103. The first 8 bits, indicated at 302, are used for record identification. The next 32 bits, indicated at 304, are utilized for 32 digital inputs at one bit per input and the last 64 bits, indicated at 306, are utilized for 4 pulsed inputs at 16 bits per input. The digital inputs are for two state indicators, such as whether a plow is up or down, whether a light is on or off, and whether a brake pedal is engaged or not. The pulsed inputs are generally used for analog type indicators such as vehicle speed, engine speed, and the like. The first 8 bits are allocated to the record identification code which is used to distinguish among the different types of records (i.e., an operational record, a pre-trigger record, a post-trigger record, or a time/date stamp record).

In a preferred embodiment, RAM 112, shown in FIG. 1, has a memory capacity of 1,835,008 bits. The first 12,288 bits are allocated to setup section 120 and the remaining 1,822,720 bits are allocated to record storage section 122. As noted above, setup section 120 contains information such as the names of the inputs, input terminal identification, the vehicle identification, calibration data, the incident storage rate, the operational storage rate, and the pre-trigger and post-trigger storage period.

Of the 1,822,720 bits in record storage section 122, a portion are initially allocated to pre-trigger storage section 206, shown in FIG. 2. This portion is equal to the number of records to be stored by the pre-trigger storage area multiplied by the size of each record. In the embodiment shown in FIG. 2, pre-trigger storage area 206 is 8 times 104 bits, or 832 bits, in size.

The amount of time it will take to fill the memory of the onboard device cannot be exactly predicted because that is dependent on the number of incidents or triggers that occur during recording. As each trigger occurs, a new pre-trigger area is allocated, thus reducing the memory area available for operational data record storage. Of course, the user may reduce the likelihood that a trigger event will occur by setting the thresholds sufficiently distant from the normal operating conditions and only defining triggers to have occurred when particularly important thresholds have been exceeded or attained.

As discussed above, a drawback of the prior art vehicle monitoring and recording systems is that the person installing the onboard unit on the vehicle must connect each sensor to a particular input channel which has been preset to accept that particular sensor. The present invention overcomes this drawback by allowing any of the 32 digital inputs to be connected to any 2-state device and any of the 4 pulsed inputs to be connected to any pulsed device. The inputs may then be identified and labeled later during setup.

Typically, after an onboard unit 104 is installed in a vehicle, portable computer 116 is connected to onboard unit 104 with a serial cable via a serial port in communication section 114. Of course, computer 116 need not be portable, but portability facilitates connecting computer 116 to onboard unit 104 if a serial cable is to be used. A setup software program runs on portable computer 116 that allows the user to provide certain setup information to setup area 120 of RAM 112. Through this setup software program the user may provide the setup parameters such as the operational mode storage interval, the incident mode storage interval, and the pre-trigger and post-trigger storage periods. Also, the setup software program allows the user to provide vehicle identification, label the data inputs, visually monitor the data inputs, provide analog calibration data, and to provide time and date information.

To label each data input, the program prompts the installer to operate the sensor. The program identifies the energized wire and prompts the installer to label that signal by inputting a name or label. This procedure is repeated for each of the data inputs. In the preferred embodiment, the setup software program is menu driven.

After data has been recorded by onboard unit 104, the user may download the data by again connecting portable computer 116 to onboard unit 104 via the serial port in communications section 114. It should be noted that the communication connection between onboard unit 104 and computer 116 may be accomplished through means other than a serial cable. RF, infrared, cellular, or other communication means may be employed for this purpose. A software program that runs on portable computer 116 is provided to efficiently download the data.

Further, a software program that runs on portable computer 116 or analysis computer 118 is provided to efficiently analyze the data once it has been downloaded into either computer, to efficiently mark and store the data, and to output the data to a printer, disk, or the like. This software program also allows the user to monitor the data signals from sensors 102 in real time.

Figure 4:
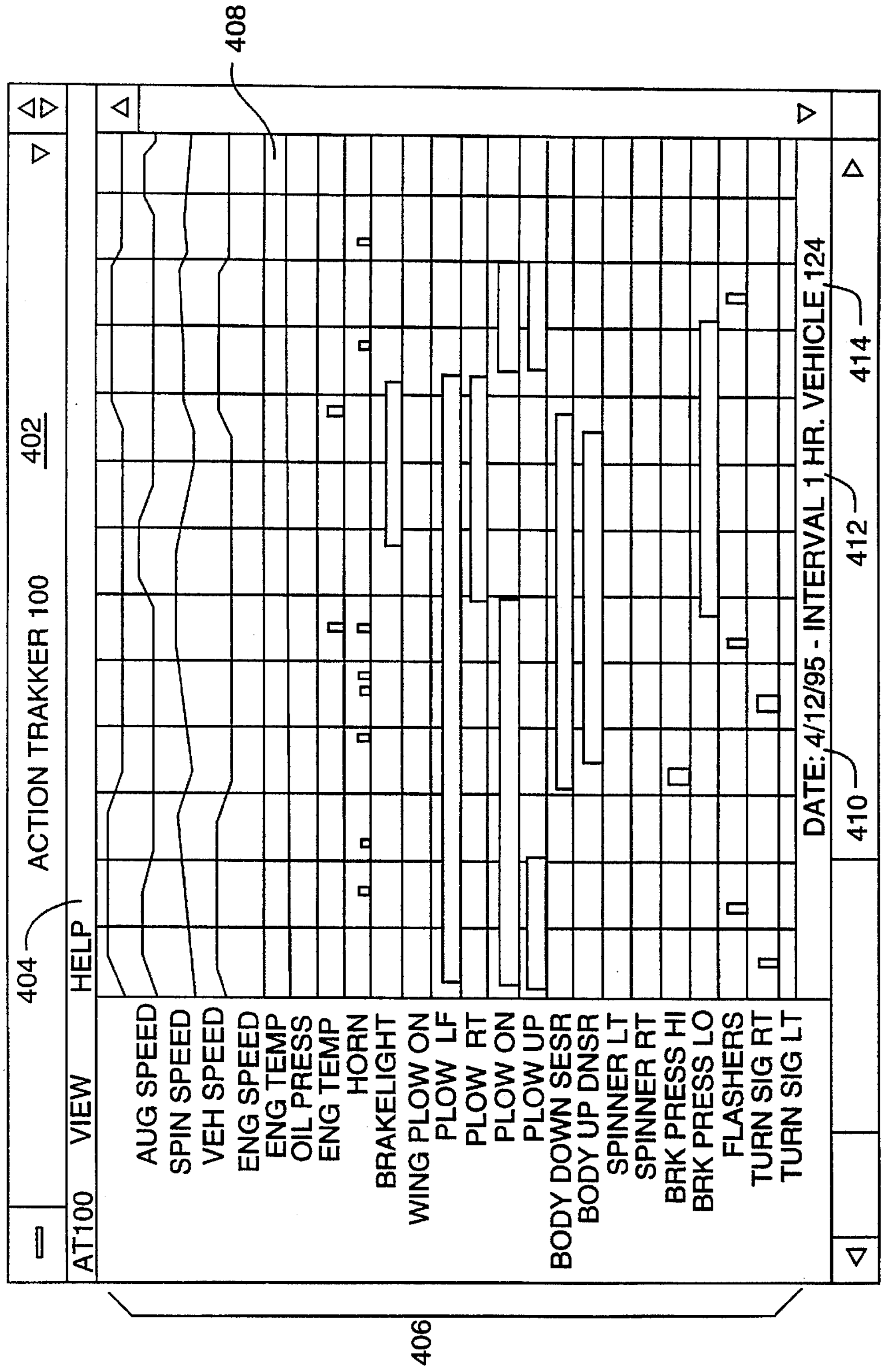
FIG. 4 shows one type of display provided by the data analysis software.

FIG. 4 shows one type of display provided by the data analysis software. The display shown is a Windows™ type display, with the trade name 402 of the device shown in the header bar. Several typical Windows™ features 404 are shown just under the header bar, to the left. Along the left edge are 23 data labels 406 which identify the data shown in the graph to the right of each label. The top 4 labels are for pulsed type data inputs and the bottom 19 labels are for some of the 32 possible digital type inputs. Graphs 408 correlating with the labeled data versus time are shown in the middle of the display. Below the graphs are shown the date 410, the interval displayed 412 and the vehicle identification 414. This display allows the user to determine what the operating conditions of the vehicle were as particular vehicle parameters varied.

Although the invention has been described in detail with respect to preferred embodiments thereof, it will be apparent to those skilled in the art that variations and modifications can be effected in these embodiments without departing from the spirit and scope of the invention.

We claim:

1. An onboard device located on a machine for monitoring and recording data signals, said onboard device comprising:

connector means for connecting a plurality of sensors mounted on said machine to said device;

record storage means for storing data records;

a central processing unit (CPU) for processing data signals produced by said sensors, said data signals being representative of said machine parameters;

program storage means for storing an operating program for controlling said CPU such that said CPU operates in accordance with said operating program to:

sample said data signals at a first predetermined frequency;

create data records corresponding to said sampled data signals at a second predetermined frequency, said first predetermined frequency being an integer multiple of said second predetermined frequency;

compare each of said data signals in each said data record to a corresponding predetermined threshold value to determine if any of said data signals equals or exceeds said corresponding predetermined threshold value to thus indicate a triggering event;

store data records occurring at said second predetermined frequency;

store data records occurring at a third predetermined frequency during a predetermined period immediately preceding a triggering event in said record storage means, said first predetermined frequency being an integer multiple of said third predetermined frequency; and store data records occurring at said third predetermined frequency during a second predetermined period immediately succeeding a triggering event in said record storage means.

2. An onboard device for monitoring and recording data signals as in claim 1, wherein said CPU further operates in accordance with said operating program to store in said record storage means a record containing the date and time when a trigger event is indicated.

3. An onboard device for monitoring and recording data signals as in claim 1, further comprising an indicator light for indicating when said record storage means is full.

4. An onboard device for monitoring and recording data signals as in claim 1, further comprising an indicator light for indicating when said record storage means is a predetermined amount less than full.

5. An onboard device for monitoring and recording data signals as in claim 1, wherein some of said data signals are digital type data signals and others of said data signals are pulsed type data signals.

6. A system for monitoring and recording machine parameters comprising:

a plurality of sensors positioned for sensing said parameters and for producing data signals representative of the values of said parameters;

a onboard device located on said machine for monitoring and recording said data signals provided by said sensors, said device comprising:

connector means for connecting said sensors to said device;

record storage means for storing data records;

a central processing unit (CPU) for processing data signals produced by said sensors;

program storage means for storing an operating program for controlling said CPU such that said CPU operates in accordance with said operating program to:

sample said data signals at a predetermined frequency;

create data records corresponding to said sampled data signals at a second predetermined frequency, said first predetermine frequency being an integer multiple of said second predetermined frequency;

compare each of said data signals in each said data record to a corresponding predetermined threshold value to determine if any of said data signals equals or exceeds said corresponding predetermined threshold value to thus indicate a triggering event;

store data records occurring at said second predetermined frequency;

store data records occurring at a third predetermined frequency during a predetermined period immediately preceding a triggering event in said record storage means, said first predetermined frequency being an integer multiple of said third predetermined frequency; and store data records occurring at said third predetermined frequency during a second predetermined period immediately succeeding a triggering event in said record storage means.

7. A system for monitoring and recording machine parameters as in claim 6, wherein said CPU further operates in accordance with said operating program to store in said record storage means a record containing the date and time when a trigger event is indicated.

8. A system for monitoring and recording machine parameters as in claim 6, further comprising means for connecting a microcomputer having a video display to said onboard device.

9. A system for monitoring and recording machine parameters as in claim 8, further comprising means for downloading said stored data records to said microcomputer.

10. A system for monitoring and recording machine parameters as in claim 6, further comprising means for labeling of said data signals in said CPU after said sensors are positioned for sensing said machine parameters.

11. A system for monitoring and recording machine parameters as in claim 6, further comprising means for modification of said second and third predetermined frequencies.

12. A system for monitoring and recording machine parameters as in claim 6, further comprising means for modification of said predetermined number of sequential data records immediately preceding a triggering event stored in said record storage means.

13. A system for monitoring and recording machine parameters as in claim 6, further comprising means for real-time monitoring of said data signals provided by said sensors.

14. A system for monitoring and recording machine parameters as in claim 6, wherein some of said data signals are digital type data signals and others of said data signals are pulsed type data signals.

15. A method of monitoring and recording data signals provided by sensors mounted on a machine using an onboard device having a central processing unit (CPU) for processing said data signals, a record storage means for storing data records, and a program storage means for storing an operating program for controlling said CPU such that said CPU operates in accordance with said operating program, said method comprising:

sampling said data signals at a first predetermined frequency;

creating data records corresponding to said sampled data signals at a second predetermined frequency, said first predetermined frequency being an integer multiple of said second predetermined frequency;

comparing each of said data signals in each said data record to a corresponding predetermined threshold value to determine if any of said data signals equals or exceeds said corresponding predetermined threshold value to thus indicate a triggering event;

store data records occurring at said second predetermined frequency;

storing data records occurring at a third predetermined frequency during a predetermined period immediately preceding a triggering event in said record storage means, said first predetermined frequency being an integer multiple of said third predetermined frequency; and storing data records occurring at said third predetermined frequency during a second predetermined period immediately succeeding a triggering event in said record storage means.

* * * * *